March 23, 1943. J. BALLARINO 2,314,755
SPOON HOLDING ATTACHMENT FOR COOKING PANS
Filed Dec. 15, 1941
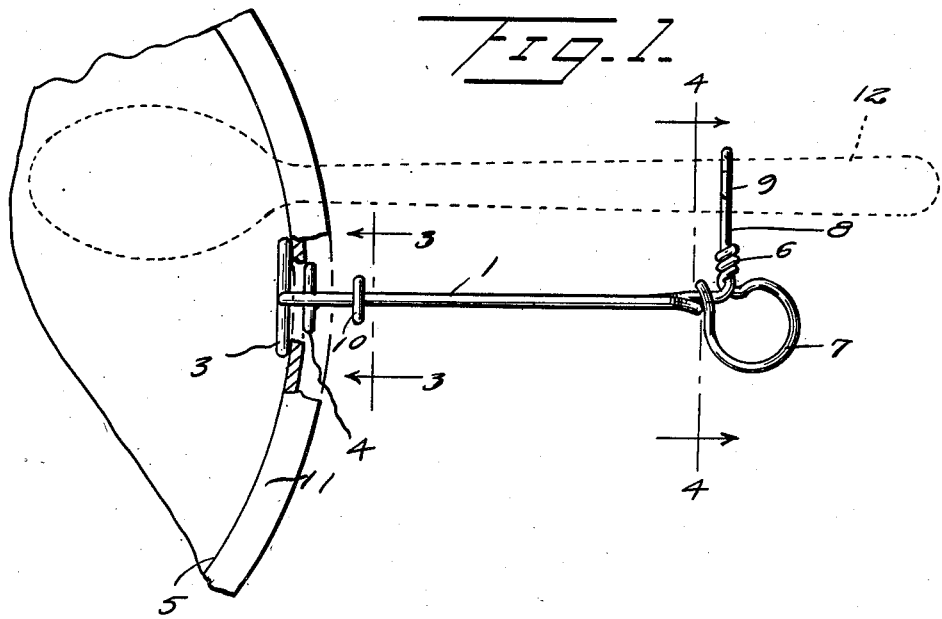
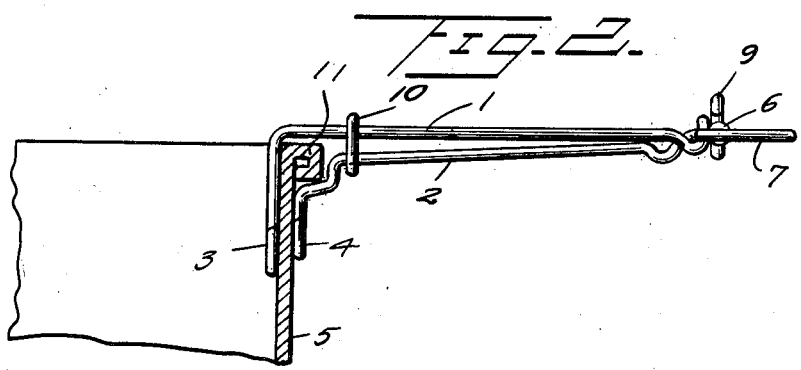
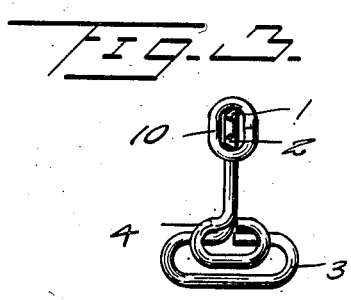
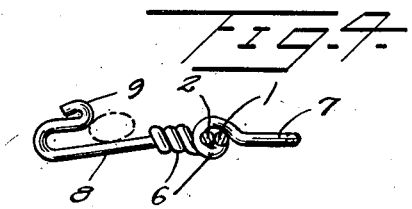
Inventor
Joseph Ballarino Patented Mar. 23, 1943

2,314,755

UNITED STATES PATENT OFFICE 2,314,755

SPOON HOLDING ATTACHMENT FOR COOKING PANS

Joseph Ballarino, Gary, Ind.

Application December 15, 1941, Serial No. 423,116

1 Claim. (Cl. 65—65)

This invention relates to new and useful improvements in spoon holders, and more especially to what may be called a spoon holding attachment for cooking pans.

The primary object of my invention is to provide a holder for the spoon when cooking anything that requires stirring and whereby the spoon may be conveniently held in such a manner as to avoid dripping liquids from the spoon on the stove.

A further object of my invention is to provide a spoon holding attachment of the character specified which may be constructed from several pieces of wire suitably bent and twisted together to provide unique pan attaching and spoon holding means.

A still further object of my invention is to provide a spoon holding attachment for pans, which is simple and economical in construction and highly efficient and durable in use.

With the foregoing and other objects in view that will appear as the nature of my invention is better understood, the same consists in the novel features of construction, combination and arrangement of parts illustrated in the accompanying drawing and more particularly pointed out in the appended claim.

In the accompanying drawing, which is for illustrative purposes only and is therefore not drawn to scale:

Figure 1 is a plan view, illustrating the application of my invention.

Figure 2 is a side elevation.

Figure 3 is a vertical transverse section, taken on line 3—3 of Figure 1 and Figure 4 is a similar view taken on line 4—4 of Figure 1.

Referring to the drawing for a more particular description of my invention, and in which drawing like parts are designated by like reference characters throughout the several views, A designates a cooking pan of an ordinary or approved type and B my improved spoon holding attachment, as a whole.

My attachment essentially comprises the upper and lower resilient body portions 1 and 2, respectively, each constructed from a single piece of wire, formed at their inner ends with the right-angularly bent loop-shaped clamping heads or members 3 and 4, adapted to slip over and engage the inner and outer sides of the rim 5 of the pan.

In carrying out my invention, the outer ends of the aforesaid wires are twisted together, as at 6, and bent to form the loop 7 and transverse supporting arm 8. The loop 7 forms a convenient handle for the user and a practical means to support the device on a nail or the like when not in use, and the arm 8 is formed at its outer end with the inwardly bent hook or clip 9, the purpose of which will presently appear.

A wire loop 10 encircles the outer ends of the resilient body portions 1 and 2 of the attachment, and in practice, the attachment is applied by slipping the loop-shaped clamping heads 3 and 4 over the edge 11 of the rim 5 of the pan and sliding the wire loop 10 from the outer to the inner ends of the body portions aforesaid to hold the clamping heads firmly against opposite sides of the rim. After stirring, the outer end of the spoon handle 12 is inserted under the inwardly bent hook or clip 9 of the supporting arm 8, with the inner end of the handle extending horizontally over and across and resting on the rim of the pan. When in this position, the bowl of the spoon is disposed over the pan and there is consequently no possibility of any of the liquid from the spoon dripping on the stove.

When using a spoon with an oval or round handle the spoon handle rests against the inner edge of the inwardly bent hook 9, as indicated by the dotted lines in Figure 4 of the drawing.

The device will hold and support any size or shape of spoon and may also be used as a holder for forks or similar articles.

From the foregoing description taken in connection with the drawing, it is thought that the construction, operation and advantages of my invention will be readily understood, without requiring a more extended explanation.

Having described my invention, what I claim as new and desire to secure by Letters Patent, is:

A spoon holding attachment for cooking pans, constructed from two or more pieces of wire bent to form upper and lower resilient body portions provided at their inner ends with loop-shaped clamping heads and twisted together and bent at their outer ends to form a horizontal transverse supporting arm terminating at its outer or free end in an inwardly bent hook or clip, the clamping heads adapted to fit or slip over the edge of the pan rim and engage opposite sides of the latter and the transverse arm forming a support for the outer end of the spoon handle, and a wire loop encircling the resilient body portions of the device and adapted to hold the clamping heads firmly against the sides of the rim when slid into operative position, substantially as and for the purpose specified.

JOE BALLARINO.